Patented Aug. 11, 1936

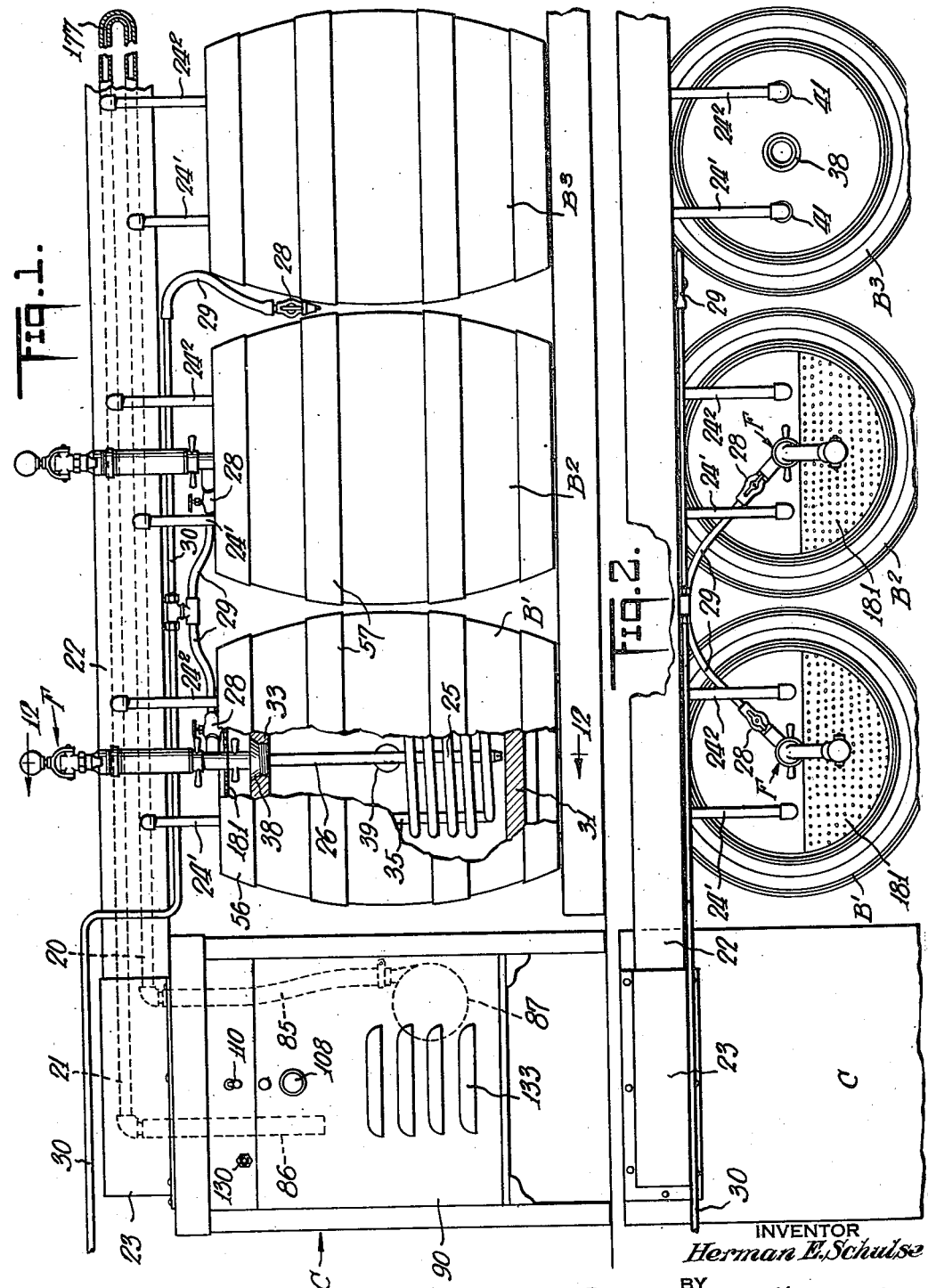

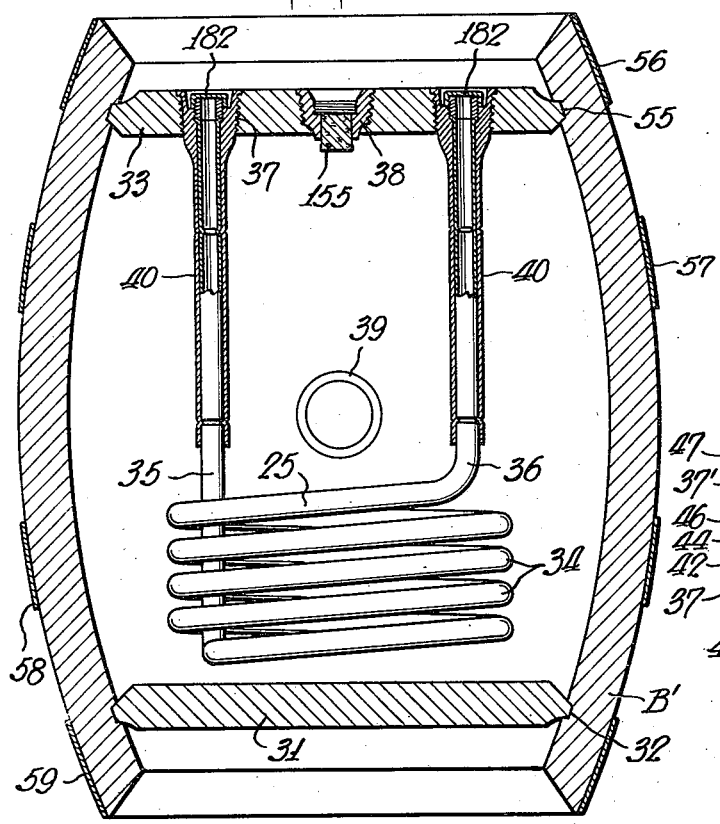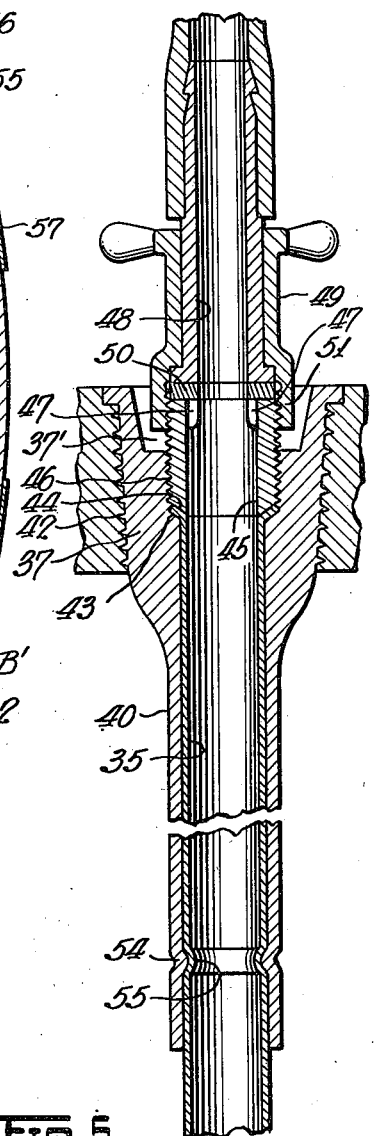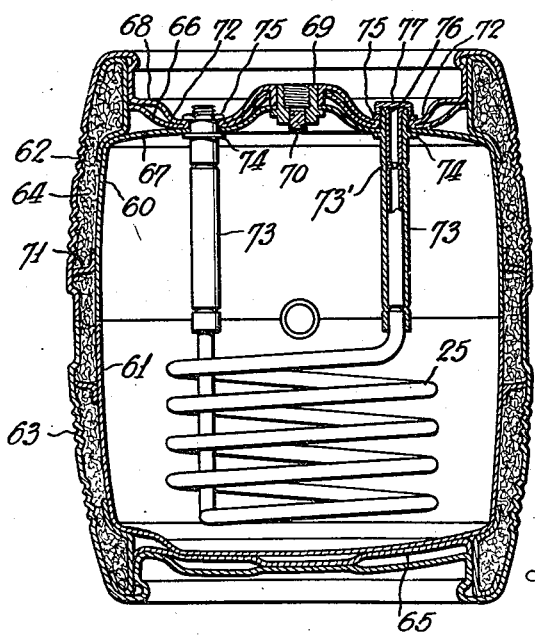

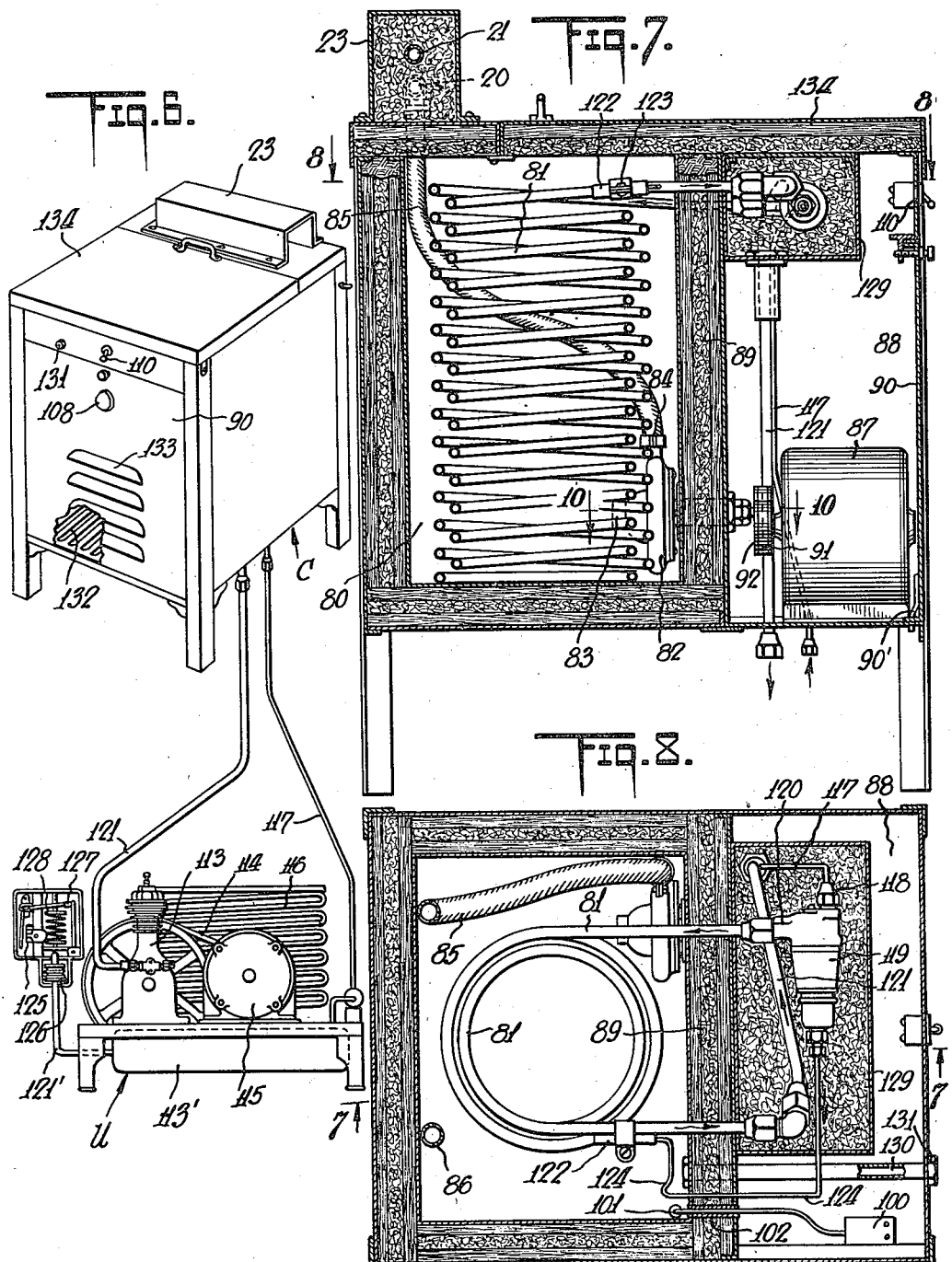

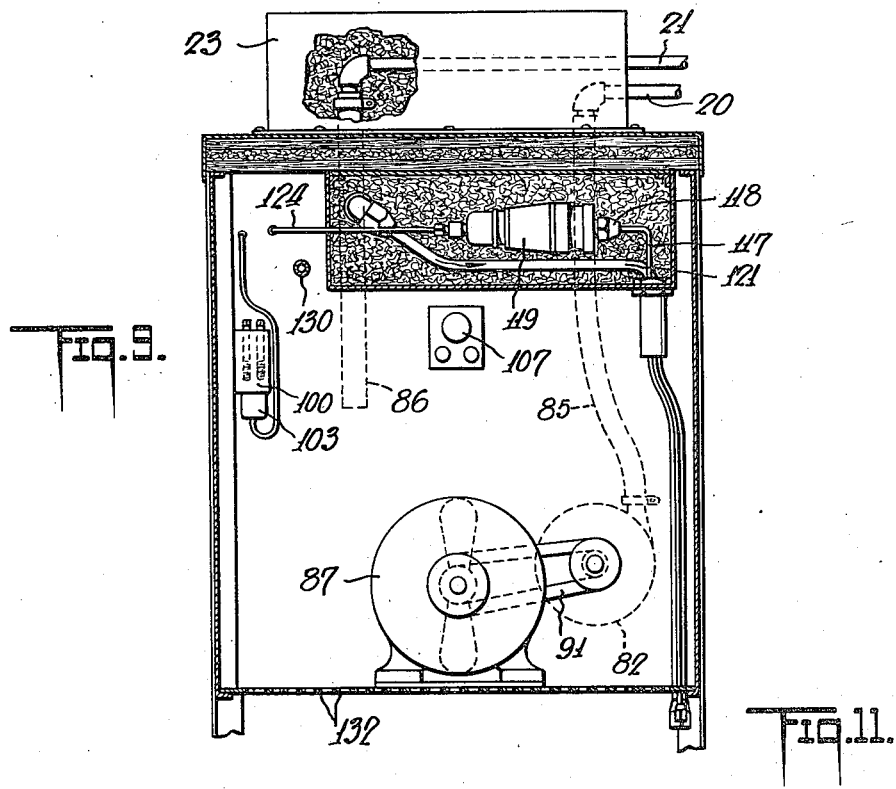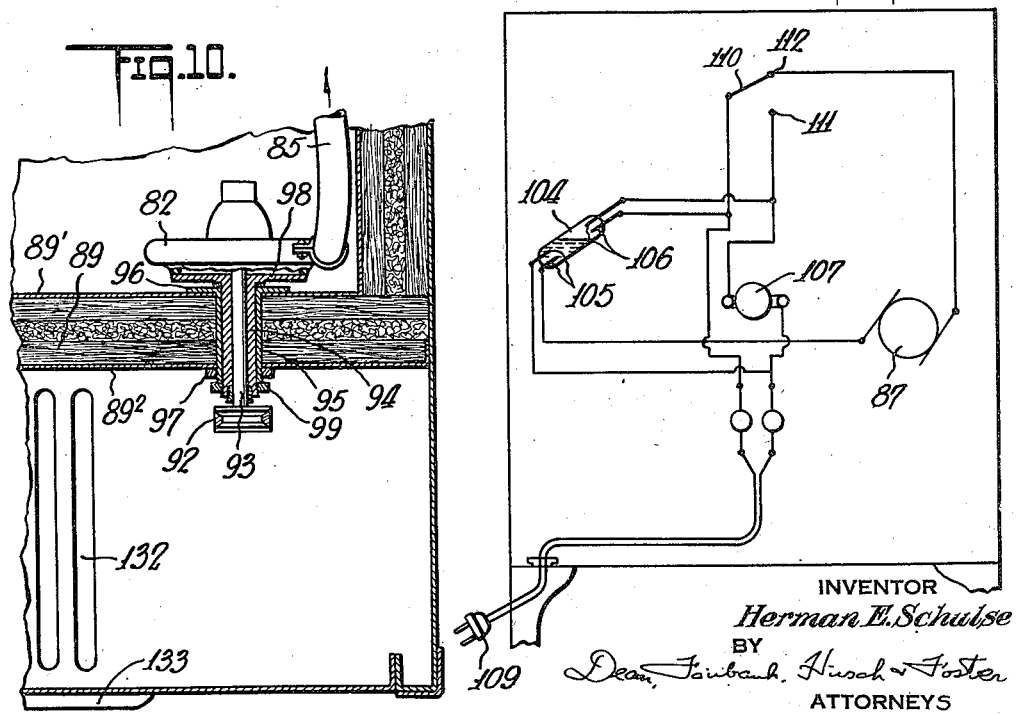

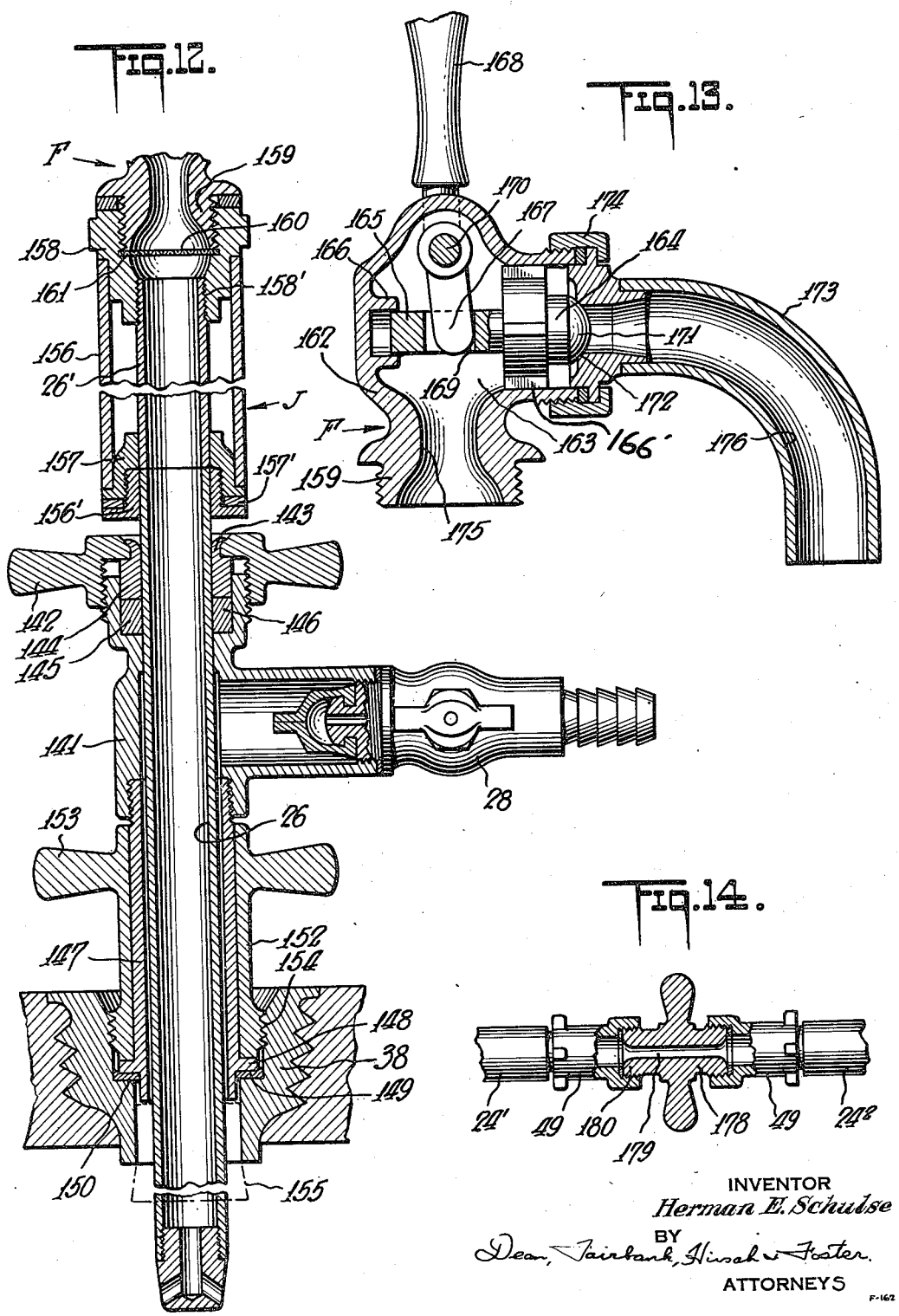

2,051,013

UNITED STATES PATENT OFFICE 2,051,013

ART OF BEVERAGE CONDITIONING AND DISPENSING

Herman E. Schulse, East Orange, N. J.

Application December 28, 1934, Serial No. 759,440

16 Claims. (Cl. 225—1)

My present invention relates to methods and apparatus for use in bar rooms, restaurants and the like, to dispense beer and similar brew for consumption.

While the brewmaster's art has developed beer of excellent quality, deterioration commonly sets in by the time this easily spoiled beverage from the barrel reaches the ultimate consumer. Such impairment is due to a number of causes, one of which is the unsanitary condition of feed pipes and beer cooling coils in which slimy deposits of sticky or scaly ingredients of the beer have accumulated and developed germ cultures, tending to spoil the flavor of the dispenser beer flowing therover, if not to infect the contents of the barrel by the return thereto of germ laden stale beer from the pipes. It is also found, that even beer of highest quality, that has become warm in the barrel, develops cloudiness and loss of quality if suddenly chilled according to conventional practice in the course of beer dispensing, and this condition is especially aggravated where the beer was prepared by accelerated modern processes. A third cause for impairment in quality appears to be the commingling with beer being dispensed, of gases released in previous dispensing operations and imprisoned in the cooling and dispensing passages.

It is an object of the invention to provide methods, installations and equipment for dispensing, without waste and at the optimum temperature, clear and unclouded beer having the quiescence and thick creamy collar or head desired, possessing the full zest imparted by the brewery, with no foreign taste or loss in quality, incurred for instance, by infection or by too sudden chilling, or by commingling with the beer being dispensed of gases released in previous dispensing operations.

Another object is to effect considerable simplification in beverage cooling and dispensing equipment, the installation being of rugged elements, lacking delicate adjustable parts, and in particular eliminating beer pipe lines, cooling coils, tanks or receptacles, float control valves, pressure valves and other complicated and costly devices commonly used in beer dispensing installations.

Another object is to provide a method and installation of the above type in which there is avoided the use of either water ice or "dry ice", and in which, though the beer is not passed through cooling coils, the cooling is yet effectively accomplished without resort to a cold storage room.

Another object is to provide a brew cooling installation and method, simple in construction and operation, and substantially proof against derangement, which largely dispenses with the need for cleaning service or the use of pipe cleaning compounds, the beer being maintained quiescent at the desired temperature within the original transportation barrel, without either propelling or agitating it in the course of cooling, and without trapping or segregating any part thereof, either within or outside of the original transportation barrel.

Another object is to provide a method and installation of the above type, the cost of operation and maintenance of which is substantially less than the corresponding cost with cooling installations or systems in common use, and which yet is efficient, expeditiously to bring the brew to any desired temperature for which the installation may be set, and which is substantially proof against either under-cooling or over-chilling the beer.

Another object is to provide methods and installations of the above type by which the spoilage or "souring" of barreled beer delivered to the dispensing establishment is substantially precluded, and the great expense to the brewery of replacing such spoiled beer, and the incidental loss in revenue stamps thereto affixed are eliminated.

Another object is to provide methods and installations of the above type by which the quality of the beer is in nowise affected, regardless of how warm may be the store or room in which it is kept on reserve and of how long the beer is kept in the barrel or keg before service, whether prior or subsequent to tapping.

Another object is to provide methods and installations of the above type by which beer may be dispensed into a glass or other vessel with any desired head or collar and without the waste incurred by "combing" or otherwise.

Another object is to provide an installation of the above type which admits of convenient removal of a barrel or keg when empty and of convenient installation into the system of a fresh unit, and without leak of cooling fluid during that process.

A feature of the invention is the cooling and maintaining cool of the beer within the original transportation container or barrel by the circulation into heat transfer relation with the beer of pre-cooled fluid, preferably water, which by virtue of its circulation, transfers heat from the entire body of brew within the container, much more efficiently than is accomplished with systems involving a stagnant cold body, such as ice.

Another feature is the circulation of the cooling fluid in a continuous cycle from a supply tank through cooling conduits or coils connected in parallel in the interiors of a plurality of containers or barrels, such circulation occurring without disturbance in the heat insulating or air excluding character of the barrels and without necessitating the tapping of any barrel until required.

Other features will be pointed out hereinafter.

So much of the patentably novel disclosure of the present application as is not per se claimed herein is the subject of the following applications:—Serial No. 91,333, filed July 18, 1936 in which the container, barrel or keg structure with its cooling appurtenances is claimed and which is a continuation in part of the present application; Serial No. 91,334, filed July 18, 1936, in which the cooling cabinet and the means for controlling the circulation and temperature of the cooling medium are claimed and which is a continuation in part of the present application; and Serial No. 91,335, filed July 18, 1936 in which the draft rod and faucet equipment are claimed and which is a division of the present application.

This application is a continuation in part of my copending application, Serial No. 688,779, filed September 9, 1933.

In the accompanying drawings, in which are shown one or more of various approved embodiments of the several features of the invention, Fig. 1 is a front elevation partly broken away of a preferred installation, Fig. 2 is a plan view thereof, Fig. 3 is a view in longitudinal section of a wooden barrel modified in accordance with the invention, Fig. 4 is a view in longitudinal cross-section of one of the connections coupling for the cooling coil within the wooden barrel, Fig. 5 is a view in longitudinal cross-section of a metal barrel modified in accordance with the invention, Fig. 6 is a perspective view of the control cabinet and associated refrigerating apparatus, Fig. 7 is a view in longitudinal section through the control cabinet, and on a larger scale.

Fig. 8 is a transverse cross-sectional view taken on line 8—8 of Fig. 7,

Fig. 9 is a view in longitudinal cross-section taken on line 9—9 of Fig. 7,

Fig. 10 is a detail view on larger scale taken on line 10—10 of Fig. 7,

Fig. 11 is a circuit diagram of the cooling water control,

Fig. 12 is a view in longitudinal cross-section of part of the draft equipment and its connections, Fig. 13 is a view partly in cross-section showing a preferred faucet construction, and Fig. 14 is a sectional view of a detail showing the use of a connection fitting to eliminate a barrel from the cooling circuit.

The installation in its general broad outlines includes a plurality of transportation beer barrels, kegs or containers, of wood or metal, which may be of standard size provided with means for cooling and maintaining at substantially drinking temperature the beer or other brew contained therein.

Cooling fluid, preferably water, is supplied from a source shown as the cabinet C adjacent the barrels through a pipe main 20 and returned through a pipe main 21. Both mains are enclosed in a common heat insulating jacket 22 extending the length of the installation and having a portion 23 on the cabinet C. Branches 24' and 24² desirably of rubber, preferably jacketed with sponge rubber, tap the respective mains and are connected to the several beer barrels B', B², B³, etc., to circulate the water in parallel into heat exchange relation with the enclosed brew, as for instance, through coils 25 to be described below.

In the copending application above identified a number of alternative constructions of the cooling conduit associated with the barrels are set forth, and these all are embraced within the scope of the invention claimed herein, but preferred embodiments are shown in Figs. 3 and 5 herein, and will be described below.

The cooling water is pumped through the mains 20 and 21 and through the conduits of the various barrels in parallel, by a circulating system, both the propulsion and temperature of the water in which are automatically controlled from the cabinet C, to maintain the beer within each of the barrels at all times at substantially the desired dispensing temperature.

Accordingly, any of the barrels can be tapped directly to dispense beer to the consumer without further chilling outside of the barrel. For this purpose, as shown roughly in Fig. 1, the barrels B' and B² are shown tapped, while the remaining barrels B³, etc. on the line are shown cooled, but in reserve until required to be tapped. The draft equipment 26 may be more or less conventional, but is preferably of the construction shown in Fig. 12 to be described below. At this point, it is simply noted that the draft tube 26 carries faucet F at its upper end and also has the conventional gas pressure connection 28 supplied from branch 29 of the gas supply pipe 30 for maintaining pressure in the keg, by which the beer is elevated to the faucet in dispensing. A semi-circular drain pan 181 is preferably laid on each barrel on tap directly under the faucet spout.

Some of the features of the installation in its broad and general outline having been mentioned, the detailed description of each of the constituent parts thereof now to follow will be more readily understood in its relation to the whole.

*The dispensing barrel or keg*

In Fig. 3 is shown the conventional wooden beer barrel, with the usual lower head 31 fitting in croze 32. The upper head 33 may have the usual draft bung 38 plugged by the usual cork 155 before the barrel is filled. The upper head, however, is modified, to carry the cooling liquid circulating element, preferably a coil 25, of suitable metal tubing. The cooling coil may include a number of convolutions 34 rising in helical form from slightly above the bottom of the barrel and of outer diameter somewhat smaller than that of the head, as shown. The unitary piece of tubing 25 includes at one end a riser 35 rising from the lowermost convolution and at the other end, a shorter riser 36 rising from the uppermost convolution, said risers connected at their upper ends in liquid-tight relation to corresponding bushings 37 in the barrel head.

Illustratively the tubing described, may be of stainless steel ⅝ inch in diameter and about 14 feet long, which exposes a substantial cooling surface to the beer, a surface of area in excess of 300 square inches. Should the contents be warm when the barrel is initially connected in the cooling system, beer at proper drinking temperature can be tapped therefrom after a few minutes, since the coil performs its maximum cooling effect near the bottom of the barrel from which the beer is drawn. The cooling coil being clear of the axis of the barrel, there is no interference with the draft tube inserted through draft bung 38 and extending the full height of the barrel.

The bushings 37 mounting the risers of the cooling coil are preferably in a diametral plane at right angles to the axis of the filling bung 39, and the cooling coil is wholly below the filling bung. Accordingly, there is no interference with the insertion of the conventional brewer's filling or racking tube commonly extended across the entire diameter of the barrel in charging or filling.

The cooling coil in the filled barrel is adequately steadied by the incompressible liquid contents, against vibration, even in rough handling. To guard against injury to the coil by rough handling in the return of the empty barrel to the brewery, guard sleeves 40 rigid with the bushings 37 encircle the risers 35 and 36 above the convolutions 25, which impart sufficient stiffness for the purpose.

In Fig. 4 a preferred arrangement for affixing the cooling coil end and the guard sleeve to the barrel head is shown. For this purpose, the metal bushing 37 is preferably threaded as at 42 into the wooden barrel head. This bushing presents an oblique seat 43 upon which rests the correspondingly flared upper end 44 of the cooling coil riser 35 or 36. A metal nipple 45 correspondingly beveled at its lower end 46, is threaded into the upper part of the bushing 37 and has lugs 47 by which with the use of a suitable wrench it may be screwed tight against the flared pipe end 44. As shown in Fig. 3, the upper end of nipple 45 is countersunk in the corresponding depression 37' in the bushing 37, and has cap 182 threaded thereon, and readily removed when the barrel is to be introduced in the cooling circuit.

The flexible hose coupling sleeve 48 may be affixed to nipple 45 by means of an enclosing swivel sleeve 49 threaded on the nipple, the clamping pressure being exerted through a compressible washer 50. Each guard sleeve 40 is preferably a unitary part of the corresponding bushing 37 and snugly encircles the associated pipe riser 35, 36. Preferably the guard sleeve 40 is rolled inward as at points 54, to form corresponding beads 55 in the pipe riser, thereby to maintain the connection effective, without undue strain on the flare connection 44.

It is clear that the head 33 equipped with the cooling coil as set forth, may be applied to conventional constructions of newly made beer barrels, which would be of volume slightly larger than standard, to compensate for the space occupied by the cooling coil, so as to afford a net volume equal to that of conventional barrels. The invention is, however, applicable to beer barrels of standard capacity at present in use, the effective capacity of which, according to my invention, is not altered despite the space occupied by the cooling coil. For this purpose, unlike the conventional barrel head, the main thickness of which extends below the conventional croze 55, the head 33 is conformed as shown in Fig. 3, to have the major part of its thickness extend above said croze. The barrel head is accordingly as thick and substantially as strong as the conventional head, but there is thus added sufficient effective capacity to the barrel, to compensate for the presence of the coil.

For installing the cooling unit in a conventional barrel, it is merely necessary to remove the upper two hoops 56 and 57, to loosen the third hoop 58 without disturbing the fourth hoop 59, which holds the staves together, then to apply the new head 33 with its attached cooling coil, and to reapply and re-tighten the hoops.

Wooden beer barrels have to some extent been superseded by metal barrels and in Fig. 5 is shown the application of the present invention to one construction of such metal barrel for cooling and maintaining the beer cooled therein. The barrel illustratively shown, comprises complementary inner half barrels 60 and 61, welded together at their contacting rims and complementary outer half barrels 62 and 63, similarly welded together, to determine therebetween a space which may serve to provide a heat insulating jacket of dead air or partial vacuum, but which is ordinarily filled with a suitable insulating stuffing 64. The lower head of the barrel includes stiffening structure 65 interposed between and engaging the inner and outer head elements thereof. The upper head is similarly provided with stiffening structure 66 between the head elements 67 and 68 thereof. The tapping or draft bung 69 fixedly connects the middles of the upper head elements and is plugged by the usual cork 70 before the barrel is filled. Preferably the structure is strengthened by metal ribs 71 intervening between the inner and outer wall elements of the barrel.

The construction, which as thus far described, is known, and not my invention, is modified to accommodate the cooling coil 25 of the same conformation shown in the wooden barrel of Fig. 3. For this purpose, the outer upper head 68 has depressions 72 at which the head elements 66, 67 and 68 are brought into contact, as shown, and through apertures in which guard sleeves 73 protrude, each provided with a flange 74 abutting and welded to the inner head 67 and further rigidly fixed to the barrel by a nut 75 threaded upon the protruding end which is located within the depression 72. The guard sleeve 73 at its upper end supports the outwardly flared end 76 of the cooling coil riser, and is pressed inward at beads 73' about the riser to relieve the tension on the flared end 76. A cap 77 is most desirably removably screwed on to the upper exposed end of sleeve 73, which cap is removed when the barrel is connected into the cooling circuit. It is clear that the hose coupling sleeves are connected to the barrel by screwing the swivel connector sleeves 49 shown in Fig. 4 over the upper threaded ends of the guard sleeves 73.

*The cooling and control system*

The equipment for supplying the cooling liquid to the pipe 20, which except for the conventional compressor and condenser unit U is shown contained in the cabinet C, is shown in Figs. 6 to 10. Said cabinet C includes a tank 80 for the cooling water in which the refrigerating coil 81 is immersed.

Any suitable type of commercial refrigeration unit controlled by any of the standard methods, either temperature or pressure, or a combination of the two, may be used to supply a compressed refrigerant to the expansion valve on an evaporation coil in a circulating tank.

The water tank 80, which is enclosed in a heat insulating jacket, has near the bottom thereof a water circulating pump 82 which is preferably of the centrifugal type and has an axial inlet 83 communicating directly with the water in the tank and an outlet 84 rising therefrom and connected by means of a hose 85 to the supply main 20 from which the circulating water reenters the tank 80 by way of return main 21 which discharges through a tail pipe 86 opening at a level well below the coil connections in the heads of the barrels.

The pump 82 is driven by an electric motor 87 disposed in the control compartment 88 of the cabinet, preferably in front of the water tank 80, from which it is separated by thick heat-insulating wall 89. All of the control elements of the cabinet are preferably located in this control compartment, to which access is readily had through a door 90 in the front. The electric motor is connected preferably by a belt 91 to a pulley 92 on the pump shaft 93, shown in Fig. 10. This pump shaft has a water-tight bearing in the thick partition wall 89, composed of sheet metal plates 89' and $89^2$ separated by heat insulation. Shaft 93 revolves in a bearing 94 comprising an axial extension of the pump casing, and supported in a liner sleeve 95 extending through the insulation and rigidly connected to plates 89' and $89^2$ of the partition wall. Preferably liner sleeve 95 has an integral flange 96 against partition plate 89' and is held in place by means of a nut 97 reacting against partition plate $89^2$. Bearing 94 carries a compressible washer 98 which is forced against liner sleeve 95 by means of a nut 99 threaded on the forward end of said bearing.

The electric motor 87 operates continuously while the system is in service, and as long as the water in the tank 80 is kept within the desired range of temperature for cooling the beer. A control is, however, provided for automatically arresting the circulation of cooling water, preferably by disconnecting the circuit of motor 87, should the refrigerating system become deranged and the temperature of the cooling water in the tank rise above the permissible maximum. At the same time, a normally inactive signal apprises the operator.

A preferred apparatus for this purpose comprises a thermostatic switch 100 in the control compartment operated from a thermostatic bulb 101 in water tank 80, the stem of said bulb extending therefrom through rubber bushing 102 in the insulating wall 89.

The thermostat 100, the details of which may be entirely conventional, includes a flexible metal diaphragm 103 operated by the expansion of fluid in the bulb 101 to tilt a mercury tube 104 (Fig. 11) so that in one position, the contacts 105 thereof are bridged and contacts 106 open, while in the oppositely tilted position, that relation is reversed. The signal, preferably an electric signal lamp 107 in back of a red bull's-eye 108 at the front of the cabinet, is connected in circuit with the motor 87 and the thermostatic switch 100 in manner shown in Fig. 11 and now to be described.

In the setting of Fig. 11, the circuit from the usual wall plug 109 is closed to the motor 87 by way of contacts 105, but the circuit to the signal lamp 107 is normally open at the gap between contacts 106 in the mercury tube 104 of the thermostatic switch 100. When the mercury tube is oppositely tilted, due to expansion in the thermostatic bulb 101, by rise of the temperature of the cooling water say to 40° F., it is clear that the motor circuit is interrupted at contacts 105, but the signal lamp circuit is now closed by the bridging of the mercury across contacts 106. The installation is thus proof against the pumping of insufficiently cool water from the tank 80 through the beer kegs. No sooner is the permissible temperature of the cooling water exceeded then the pump ceases operation, and the signal lamp 107 flashes on to apprise the attendant of the need for service. A thermostatic flasher lamp may be used for the purpose if desired. The beer in the barrels being at substantially drinking temperature, when the trouble lamp flashes on, the attendant may, despite the interruption of cooling circulation, continue serving beer therefrom in substantially perfect condition for a substantial period of time pending repair.

At the front of the control compartment, a hand-operated switch 110 also shown diagrammatically in Fig. 11 is preferably provided. This switch serves manually to disconnect the circuit to pump motor 87, as is, of course, necessary whenever it is desired to replace an empty barrel. As shown in Fig. 11, when the switch 110 is shifted from the normal position shown, to close on contact 111, the circuit to the motor 87 is interrupted at point 112, while a direct circuit to the signal lamp 107 is established through the switch arm 110, without however interfering with the normal setting shown, of the mercury tube 104. The flashing of the lamp 107, of course, reminds the attendant to reset the switch 110 as soon as he has connected up the new barrel. The switch 110 is preferably of the spring urged type, so that it cannot remain in any position other than on contact 111 or on contact 112.

A desirable refrigeration cycle for keeping the cooling water in tank 80 at proper temperature involves the use of a suitable compressor unit ordinarily disposed below the dispensing establishment, said unit including, for example, a reciprocating compressor 113 driven by belt 114 from an electric motor 115, said compressor feeding the refrigerant through a contiguous condenser coil 116, where the heat is removed by radiation. The refrigerant passes from the condenser through a small pipe 117 to the inlet 118 of an expansion valve 119 and from the outlet 120 thereof to the refrigerating coil 81 in the cooling water tank 80. The return from the refrigerating coil 81 flows through the pipe 121 of larger diameter than inlet pipe 117 back to the compressor, in which the vapor is restored to the liquid condition and cooled in condenser 116, for repetition of the refrigerating cycle set forth.

The temperature of the refrigerant is thermostatically controlled by means comprising a conventional thermostatic bulb 122 clamped as at 123 near the outlet of the refrigerating coil 81, and connected by tube 124 to a flexible bellows power connection (not shown) in the expansion valve 119. Thus, when the temperature in the refrigerating coil tends to drop below the minimum for which the device is set, the contraction of the thermostatic fluid causes the outlet of the expansion valve substantially to close. As a consequence, in the continued operation of the compressor 113, a suction will be generated, which is effective to overpower spring 128 and to open electric switch 125 of the compressor motor 115. Any suitable suction-operated switch can be used for the purpose. The drawings illustratively show a metal bellows 126 connected through pipe 121' to the compressor crankcase 113', and operating the switch 125 through the linkage 127.

The refrigerating cycle being now interrupted, as the refrigerating coil 81 becomes warmer, the thermostatic fluid in the bulb 122 expands to reopen the expansion valve 119, the suction in the line 121 becomes less effective until the spring 128 re-closes the motor switch 125, so that the refrigerating cycle is resumed.

The various elements, including the compressor, the condenser, the expansion valve, the thermostatic control therefor and the suction-operated electric switch 125, may each and all be of any desired known or suitable construction, and their general inter-relation to perform the cycle and control operation above set forth, is also not my invention when taken by itself. The specific correlation of the elements of the refrigerating system and its mode of cooperation with the water circulating system are, however, within the scope of my invention. The expansion valve 119, according to my invention, may be mounted in a casing 129 to guard against the possibility of frost-in , and said valve is disposed as shown, preferably near the top of the control compartment of the cabinet, through the wall 89 of which the various liquid-tight connections are made to the refrigerating coil 81 and to the thermostatic bulbs 101 and 122.

As shown in the drawings, the cabinet is provided with a horizontal overflow pipe 130 which also extends through the insulating wall 89 near the top of the water tank 80, and opens through the front of the cabinet as a 131 above the door 90, which is preferably set in to the bottom as at 90'. By the overflow pipe arrangement, the need for float valves or other level controls is obviated, the bartender or other attendant being apprised when the tank is sufficiently filled, by the overflow of water through the pipe.

Heating of the electric motor or other parts within the control chamber is avoided by arranging for air circulation through slots 132 in the bottom of the control compartment and louvres 133 in the door 90 directly in front of the motor 87.

The cover 134 of the cabinet, which is preferably hinged at its front, preferably mounts a suitable wooden board, (not shown) to serve for bread slicing and the like.

*The draft equipment*

Since all the beer or other brew is kept throughout at proper dispensing temperature within the shipping barrel or keg, it can be dispensed directly without having to pass through any chilling medium. There is shown in Figs. 12 and 13, a combined draft tube with attached outlet faucet for the purpose. The draft tube 26 is encircled by the conventional pressure gas inlet sleeve 141, the upper end of which is secured gas tight to the draft tube by a wing nut 142 to which is swivelled at 143 a land piece 144 pressing against a rubber washer 145, snugly encircling the draft tube 26 and lodged in a socket 146 in the sleeve 141.

The draft tube 26 is also encircled by a sleeve 147 the upper end of which is screwed into the lower end of sleeve 141 and which is flanged at 148 and carries a flexible washer 149 to rest on the ledge 150 within the metal draft bung 38 in the head of the barrel. The sleeve 147 is encircled by a swivel collar 152 having finger grips or a nut head 153 and threaded at 154 to fit into the metal bushing 38. When the draft tube is put in position, its lower end will in the first instance, rest upon the tightly fitting cork 155 in the bushing 38. As the sleeve 147 is now tightened into place by turning collar 152, its lower end extending beyond the flange 148 exerts pressure against the tightly fitting cork 155 in bushing 38 to loosen it by advancing it slightly. The draft tube 26 is now readily depressed through the collar 141 and sleeve 147 and bushing 38 into the barrel into which the cork is forced.

The upper part of the draft tube 26 below the faucet F mounted on its upper extremity is preferably encircled by heat insulating air jacket J to keep the enclosed draft tube cold and to prevent sweating. For this purpose, a sleeve 156 of insulating material, such as "bakelite" or vulcanite, of diameter considerably larger than that of the draft tube, is rested at its lower end upon a bushing 157 fast on the lower end of an upper section 26' of the draft tube, to which it may be cemented. The sections 26 and 26' are tightly held in abutting end to end relation, by screwing bushing 157 upon complementary threaded bushing 156' which is fastened to the upper end of tube 26, a compressible washer 157' resiliently taking the thrust.

A metal bushing 158 is screwed at 158' upon the upper end of the draft tube section 26' and exerts pressure against the upper end of sleeve 156 to which it is preferably also cemented. Into the bushing 158 is screwed the stud 159 of the faucet F. Preferably a double ply fine mesh Monel metal filter screen 160 is placed between the shoulder 161 of bushing 158 and the bottom of the faucet F and serves as a guard to intercept any loosened chip, scale or the like that might be entrained by the beer from the barrel.

It is, of course, understood that the draft tube 26 might be made in one continuous piece, but the sectioned construction shown is preferred as it facilitates disassembly for cleaning and also facilitates economical replacement of any small section or fitting that has become injured.

The faucet in general outline may be substantially conventional. It comprises a casing 162 rising from the mounting stud 159, having a chamber 163 with a sliding valve 164, the axial shank 165 of which is guided at its rear end in bearing 166, and carries at its forward end adjacent the valve a perforated guide collar 166', said valve operated by the lower end 167 of the operating lever, extending into a corresponding slot 169 in the shank 165, the lever being pivoted to the casing as at 170 and having an upstanding handle 168. The valve has a spherical seating head 171 of rubber, pressed to closed position against a spherical valve seat 172 at the inner end of the valve nozzle piece 173 assembled to casing 162 by means of a union nut 174.

The passage from the valve seat through the mounting stud of the faucet, extends longitudinally downward at 175, continuously from the valve seat to the lower stud extremity. Similarly the wall 176 of the nozzle 173 extends continuously downward in its longitudinal direction from the valve seat 172 to the spout. The middle portion of the faucet lodging the valve guide 166' extends horizontally. The trough or lower portions of the faucet passages thus serve as gutters completely and promptly to drain any remnant of brew therefrom, without possibility of brew remaining lodged or trapped therein.

*The installation and operation*

Any number of barrels of beer within the limitations of the size of the control cabinet C may be cooled and kept cool therefrom. Depending on the size of the establishment, six, twelve, twenty or more barrels of beer in contiguous relation may thus be cooled therefrom. Each of the barrels, preferably as soon as it is delivered from the brewery, is connected into the cooling circuit, by connecting the exposed ends of the cooling coil 25 thereof respectively to the inlet and outlet mains 20 and 21 by closing and tightening the connections shown in Figs. 1 and 4. By the continuous circulation of the cooling water through the several barrels of beer, the contents thereof are at all times maintained substantially at dispensing temperature. In actual use only some of these barrels will at any time be on tap. In Fig. 1, illustratively, two of the barrels B' and B² are shown on tap, with the draft tube 26 extending through substantially the height of the barrel and the faucet F extending above the barrel at the usual height of conventional bar faucets. A small amount of cold water is poured on top of the barrel head, such water serving to keep the wooden barrel head from drying out and thus prevent the possible escape of carbon dioxide gas from the barrel. The insulating air jacket J above the head serves to prevent warming of the draft tube at the upper part.

The pressure gas pipe 30 is connected by branch hoses 29 with gas inlet cocks 28 to as many barrels as are on tap, but while gas pressure of any desired value may be applied, including pressures as high as those commercially used on other systems, one of the advantages of this system is that it admits of the use of pressures far lower than, and in fact of but a small fraction of, those that are conventional, illustratively of the order of three pounds per square inch.

To attain the best results the pressure should be sufficiently high to cause delivery from the faucet under substantially the same conditions, whether the barrel be nearly full or nearly empty, and regardless of the loss of the head of the beer as the barrel becomes drained. The usual keg filling pressure being materially higher than the dispensing pressure preferred by me, sufficient gas is preferably bled off in the tapping operation to bring the pressure above the level of the beer down to the desired dispensing pressure for delivery of potable beer at the desired rate. Though the applied gas pressure be materially lower than that of the gas dissolved in the quiescent beer, nevertheless very little of the dissolved gas in the beer is released into the space in the barrel above the beer because of the slow rate of release of the gas from the quiescent beer which is cooled to around 42 degrees F. Thus, the major portion of the gas remains dissolved in the beer within the barrel, as the beer is normally dispensed. It is preferred to use carbon dioxide gas as the propulsive medium since it is this gas which is dissolved in the beer. In the specific embodiment above described, the gas supply may be described as at pressure substantially less than the equilibrium pressure of the gas dissolved in the brew within the container before it is tapped; and the expression "equilibrium pressure of the gas dissolved in the brew before the container is tapped (or before tapping)" as used in certain of the claims means that pressure which is the maximum pressure that the gas dissolved in the brew will exert in the container at the given temperature before the container is tapped.

The spring 128 of the suction operated valve 125 may readily be adjusted if desired, to lower or raise the controlled temperature of the cooling fluid to suit particular requirements. For instance, on very warm days, especially in large establishments, where the patrons are some hundreds of feet from the dispensing bar, it might be desirable to cool the beer to 36 or 38 degrees F., instead of the usual dispensing temperature desired in the United States of 40 to 45 degrees F., to compensate for the rise in temperature between the time of drawing and delivery.

The draft equipment, including its faucet having no horizontal portion, no trap portion and no pocket portion in which beer can collect, is self-draining as above set forth. Since no residue of beer is intercepted or trapped in the draft equipment, including the draft tube and faucet, the slimy or scaly deposit and the accumulation of germs which are a common source of trouble are practically obviated. Infection of the beer in the barrel by return flow from the draft line of stale beer carrying germ-laden slimy accumulation or delivery of such stale beer from the draft line to the faucet spout, is precluded. Although gas released after a dispensing operation may become imprisoned in the draft tube and faucet behind the closed valve thereof, it will be promptly expelled ahead of the flowing beer and through the spout 173 when the faucet is opened. There can be no commingling with the beer of gas imprisoned in the draft equipment, and the impairment of quality due to any such commingling is avoided.

The beer being under relatively low gas pressure as set forth, is comparatively quiescent or inert when dispensed, and the bubbling or extensive effervescence when beer is drawn under the usual high gas pressures is obviated. The head or collar of the beer is thick and creamy, and the minute bubbles of which it is composed, are not destroyed, as they are in conventional cooling and dispensing systems, by the impact of commingling beer with previously released gases and the further impact due to sudden expansion of high gas or air pressure when the drawn beer is exposed to atmosphere.

The beer being at all times kept at the proper temperature within the barrel, without stale, infected residue in the draft line, the waste of beer commonly incurred to clear such stale residue from the conventional chilling equipment is obviated, and the beer may be dispensed from the barrel to the last drop without deterioration in quality.

When a barrel has been emptied, another of the cooled barrels on reserve and which is already in the cooling circuit, is then simply tapped, preferably with the use of a clean reserve draft tube and is ready for dispensing.

To remove and replace an empty barrel, the switch 110 is thrown to contact 111, thereby putting the water circulating motor 87 out of operation, without disturbance to the mechanical refrigerating unit, which continues functioning. When the flexible hose couplings 24' and 24² to the empty barrel are now disconnected, no water is lost from the circulating system since the tail pipe 86 and the feed hose 85 in the tank 80, both of which extend considerably below said hose couplings, exert a siphoning suction upon the now open pipe branch ends, which are readily connected to the fresh barrel, the water level in the tank 80 being also below the level of the hose couplings. It is preferable, before connecting such fresh barrel in the cooling circuit, to pour water over its head which will fill the cooling coil 25 of such barrel, to compensate for the water removed with the cooling pipe 25 in the empty barrel that was removed.

The signal lamp 107 being in circuit as long as the circulating motor 87 remains out of circuit, the attendant is reminded to reset the switch 110 to operative position after he has installed the fresh barrel, whereupon the signal becomes inoperative, showing that the circulation of the cooling water (which has been kept cool by the uninterrupted operation of the compressor) has resumed.

No air blocking occurs in the circulating system during barrel replacement, or at any other time, since a high resistance end connection 177 between the supply and return mains 20 and 21 obviates dead air pockets in the circulating system, and thus assures air clearance.

After use, the draft equipment, as is obvious, can be readily disassembled, cleaned and re-assembled and kept ready for subsequent use.

In my system, the waste of power consumption from repeated application of relatively high starting torque to the circulating motor 87 is avoided, for this motor operates continuously and, as above noted, the circuit is interrupted only when a barrel or keg is to be replaced or should any defect occur in the mechanical refrigerating unit. It is found in practice that on an average installation of my system the operating cost is substantially less than the operating cost of conventional systems, which systems involve not only the cost of refrigeration but the cost of cleaning coils entailing the use of pipe cleaning compounds and of elaborate sterilizing service.

The great economy in power consumption is accounted for largely by the fact that the rapidly circulating cooling water in the large area cooling pipe within the barrel removes heat from the beer far more efficiently than does ice or other non-circulating refrigerant, wholly aside from the improvement in assuring the correct temperature of the beer at all times without undercooling or overchilling.

In practice, the brewery fills the beer into the barrels in super-cooled condition, say at approximately 32 degrees F., to allow for the rise in temperature during transit to the dispensing establishment. The dispensing attendant can readily ascertain whether this precaution has been followed by the brewery, for a thermometer may be inserted into one of the risers of the cooling coil 25 in the freshly delivered barrel, to ascertain the temperature of the beer therein, without the need for first tapping or otherwise opening the barrel.

The keg, upon delivery, should be promptly connected in the cooling circuit, as set forth. Of course, if the beer is cooler than the circulating water, it will promptly upon installation be warmed thereby to the desired drinking temperature.

With the use of my system, the beer in the barrel will not be spoiled, if the barrel is airtight, even though delivered relatively warm or allowed to become warm before connection into the cooling circuit, say to 65 or 70 degrees F., provided it has not remained at that temperature sufficiently long for any substantial secondary fermentation to have taken place. In the event that the beer in the barrel has had such elevated temperature, it is preferred to keep the barrel connected in the cooling circuit for a sufficient time to have the entire contents substantially cooled before drawing the beer.

In case a fresh barrel of beer is not available when one has become empty, no harm is done or waste of power incurred, by keeping the empty barrel on the cooling circuit, since no appreciable heat dissipation occurs through the air in the empty barrel. However, the barrel may be promptly disconnected, if desired, and the ends of the inlet and outlet hose for the cooling system thereof, may be directly connected, preferably through a high resistance fitting 178 (Fig. 14) having a restricted longitudinal passage 179 and threaded ends 180 over which the swivel sleeve 49 of each of the pair of branch hose 24' and 24² is screwed. The fitting 178 affords a resistance to flow, preferably of the order of that of the cooling coil of a barrel, so as not to short-circuit the cooling conduit of other barrels or kegs on the line. Instead of the fitting 178, a double ended imperforate plug of bakelite, vulcanite or the like might be used to shut off the passage between the two hose branches across the mains.

Since in the present system, the beer on the line is kept in the barrel at the proper temperature and hermetically sealed from the outside air, the quality is in nowise affected, regardless whether dispensing occurs promptly after delivery or many days or weeks later.

If any trouble of any character in the system causes the temperature of the circulating cooling water in the tank 80 to reach the maximum permissible temperature, say of 40 degrees F., then, whether this rise of temperature results from the blowing of a fuse, failure of the condensing unit, or a defect in the refrigerating cycle, or whether this be due to any other cause, the bull's-eye 108 in front of the cabinet promptly registers, to apprise the attendant of the need for some attention. As long as such signal registers, no water is pumped through the barrels, and therefore the barrels will not be heated up by the eventual circulation of warm water, and the beer will remain cool in the heat insulated barrels for some time thereafter, to permit dispensing of beer therefrom in palatable condition pending repair.

The use of water as the cooling agent to be circulated through the brew barrels is preferred not only because of its negligible cost but because it has no corrosive or other deleterious action on the conduits of the barrels, and furthermore can be circulated under low pressure and so admits of the use of thin-walled tubing of correspondingly light weight and low cost. It is understood, however, that the invention embraces within its scope, as defined in certain of the claims, the use of any fluid cooling medium to be circulated through the brew barrel conduits, whether that medium be a brine or a vaporizable refrigerant and regardless by what means the heat be abstracted from the brine or other refrigerant after it has circulated through the barrels.

It is noted that in the unusual event that a conduit within the barrel should develop a leak, the gas pressure prevailing in the barrel will result in driving some of the contents of the barrel through such leak into the cooling conduit, but the beer remaining in the barrel with the leaky coil is in no wise impaired or diluted, and may be served substantially unimpaired.

It is also understood, that while it is preferred after each dispensing operation to remove any remnant of brew from the faucet and draft tube by drainage, the invention in its broader aspects embraces the clearing of any beer feeding conduit that delivers from the barrel to the faucet spout, by resort to other means, including, for instance, the application of gas pressure for the purpose.

The invention has its major field of application in the cooling and dispensing of "beer", which term is not to be narrowly construed, but embraces kindred beverages, whether of higher or lower alcoholic content, and including the brews commonly known as ale, porter, stout, Weissbier, saki and the like.

The term "in heat conductive relation" as used in some of the claims to define the relationship of the circulating cooling fluid to the brew in the container means that the cooling fluid is separated from the brew by a heat conducting wall of good heat conducting material, most desirably metal, and is not to be taken as including a relationship in which the separating wall is a relatively poor heat conductor, such as a wall of wood.

As stated, the beer in the barrel set up in dispensing position is cooled to and maintained within a predetermined dispensing temperature range around 42 degrees F. by the circulation of water at a temperature below 40 degrees F. The expression "within a predetermined dispensing temperature range" as used in the claims is to be understood as meaning a temperature which is around a predetermined dispensing temperature of 42 degrees F. That dispensing temperature, as pointed out, may be varied somewhat by adjusting the controlled temperature of the cooling water. By keeping it in the barrel within such dispensing temperature range, beer such as now generally made may be dispensed substantially free from cloudiness and without release of any large part of its dissolved gas.

It will thus be seen that there are herein described methods and apparatus in which the several features of this invention are embodied, and which in action attain the various objects of the invention and are well suited to meet the requirements of practical use.

As many changes could be made in the above methods and construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent, is:

1. The method of treating and dispensing brew which comprises setting up in dispensing position the original heat-insulating transportation container with the brew therein, circulating cooling fluid through a path the major portion of which is near the bottom of the container, at a temperature and in an amount sufficient to cool the brew to and maintain it within a predetermined dispensing temperature range, supplying gas to the container at a pressure substantially less than the equilibrium pressure of the gas dissolved in the cooled brew before the container is tapped, and drawing brew as required from a point near the bottom of the brew through a short course extending only a short distance above the container.

2. The method of dispensing brew from the original transportation container, which comprises maintaining the brew in the container within a predetermined dispensing temperature range, supplying gas to the container at a pressure substantially less than the equilibrium pressure of the gas dissolved in the cooled brew before the container is tapped, and drawing cool brew through a passage extending only a short distance above the container.

3. The method of brew dispensing from the original transportation container, which consists in circulating cold water in heat conductive relationship with the contents of the container at a controlled temperature and in amount sufficient to cool the brew to and maintain it within a predetermined dispensing temperature range, drawing the brew through a draft outlet at the upper part of the container, and maintaining the contents of the container after it has been tapped under applied carbon dioxide gas pressure substantially less than the equilibrium pressure of that dissolved in the cooled brew before the container is tapped but sufficient to elevate the contents at the desired rate directly through the short distance to the draft outlet.

4. The method of treating and dispensing brew, which consists in setting up in dispensing position a plurality of containers with the brew therein, circulating cooling fluid in heat conductive relationship with the contents of each of said containers with heat abstracting effectiveness such as to cool the brew to and maintain it within a predetermined dispensing temperature range, tapping the containers as desired, drawing the cooled brew from the tapped containers as desired, and continuing the effective circulation of cooling fluid with respect to all of the containers to maintain the contents thereof within such temperature range until the respective containers are empty.

5. The method of treating and dispensing brew, which consists in setting up in dispensing position a plurality of containers with the brew therein and having heat insulating walls, circulating cooling water through the several containers from a common source at a temperature and at rate such as to cool the brew to and maintain it within a predetermined dispensing temperature range, tapping the containers as required, drawing cooled brew from the containers on draft as required, and continuing the effective circulation of water through all the containers until empty.

6. The method of treating and dispensing brew, which consists in standing up in dispensing position a plurality of containers with the brew therein and having heat insulating walls, circulating cooling fluid from a common source in heat conductive relationship with the brew mainly near the lower heads of the several containers and with heat abstracting effectiveness such as to cool the brew to and maintain it within a predetermined dispensing temperature range, tapping the containers as desired, withdrawing brew as desired from near the lower cooled ends of the respective tapped containers, and continuing the effective circulation of the cooling fluid to maintain the undrawn contents of each tapped container within said temperature range until it has been emptied.

7. The method claimed in claim 6 in which water is used as the cooling fluid and is circulated in parallel through the several containers, and in which the brew from the containers on tap is drawn through a short course discharging near the top of the container, and gas is applied to each tapped container under pressure substantially less than the equilibrium pressure of the gas dissolved in the cooled brew in the untapped container.

8. The method of treating and dispensing brew, which consists in setting up in dispensing position a plurality of containers with the brew therein, circulating cooling fluid from a common source in heat conductive relationship with the contents of each of said containers at a temperature and rate to adjust the said contents to and maintain it within a predetermined dispensing temperature range, tapping the containers as desired, supplying gas to the containers on draft at a pressure substantially less than the equilibrium pressure of the gas dissolved in the cooled brew before tapping, dispensing brew at will through outlets near the upper ends of the several containers on draft under the applied gas pressure, and draining the outlet passage above the level of the container contents sufficiently to permit the gas therein to be ejected in advance of the brew discharged in the next drafting operation.

9. The method of treating and dispensing brew, which consists in setting up in dispensing position a plurality of containers with the brew therein, abstracting heat from the brew in the lower parts of the several containers by circulating water in parallel through passages near the bottoms of the several containers at a controlled temperature and in amount such as to compensate for any warming of the brew through the container walls, thereby to adjust the brew near the bottoms of the several containers and to maintain it within a predetermined dispensing temperature range, tapping as required the containers thus cooled, supplying gas to the tapped containers at a pressure substantially less than the equilibrium pressure of the gas dissolved in the cooled brew before tapping, drawing brew as desired from the containers on draft from points near the bottoms thereof and discharging it at points near the tops thereof, and continuing the effective circulation of water at controlled temperature in all of the containers both in those on draft and those in reserve to maintain the brew at the level from which it is to be drawn within said temperature range until the container is empty.

10. A brew dispensing installation, comprising a plurality of transportation containers set up in dispensing position, each having heat insulating walls and each having a cooling device of heat conducting material built thereinto as a permanent element of the container and providing a cooling surface for contact with the contained brew, and means for circulating cooling fluid to abstract heat from the cooling devices of the several containers at such rate as to bring the brew in each of the containers, whether on draft or in reserve, to and to maintain it within a predetermined dispensing temperature range.

11. A dispensing installation, comprising a plurality of heat insulating transportation containers with brew therein, set up in dispensing position at the bar, each of said containers having enclosed therein a metal conduit accessible from the exterior of the container, means cooperating to feed water through the conduits of the several containers, both those on draft and those in reserve, and to maintain the water thus being fed at temperature somewhat below a predetermined dispensing temperature of the brew, whereby the brew in each of the containers is cooled to and maintained substantially at said predetermined temperature, draft tubes in the container or containers on draft, and means for supplying gas under pressure to those of the containers on draft.

12. A dispensing installation, comprising a plurality of heat insulating containers with brew therein, each of said containers having incorporated in the interior thereof a metallic cooling conduit of a length several times that of the height of the container and having an inlet and an outlet connection at the wall of the container, supply and return mains, the conduits of the several containers, both those on draft and those in reserve, being releasably connected in parallel across said mains, and means cooperating to circulate cold water through the mains and through the conduits in the several containers, and to maintain the circulating water at a controlled temperature somewhat below the predetermined dispensing temperature of the brew, whereby the brew in each of the containers is cooled to and maintained substantially at said predetermined temperature.

13. The dispensing installation as claimed in claim 12 in which the cooling conduit of each container has the major part of the effective cooling surface thereof near the bottom, in which each container has a normally sealed draft outlet in its top, and in which those containers on draft have draft tubes retained in the draft outlets and extending substantially through the depth of the respective containers to draw from the bottom of the brew.

14. A brew dispensing installation, comprising a plurality of heat insulating transportation containers with the brew therein, each having a metal structure in heat conductive contact with the brew near the bottom of the container, means for circulating cooling fluid from a common source along said several metal parts to abstract heat directly from the lower levels of the container contents, both from those on draft and those in reserve, means to control the cooling effect of the cooling fluid to adjust the brew contiguous thereto and to maintain it within a predetermined dispensing temperature range, each of those of said containers which are on tap having draft means arranged to draw brew from near the bottom thereof.

15. A dispensing installation, comprising a plurality of transportation containers with brew therein, set up in the dispensing room, each having heat insulating walls and each having means providing a flow passage having a heat conducting wall affording a cooling surface for contact with the contained brew, means cooperating to circulate cold water through the flow passages in the several containers and to maintain the circulating water at a temperature somewhat below a predetermined dispensing temperature of the brew, whereby the brew in each of the containers is cooled to and maintained substantially at said predetermined temperature, draft tubes for the containers on draft extending only a short distance above the container through which the cool brew is drawn, and means for supplying gas to the containers on draft at a pressure substantially less than the equilibrium pressure of the gas dissolved in the cooled brew before the container is tapped.

16. The dispensing installation as claimed in claim 15, in which the flow passage in each container is a metal conduit having the major portion of its surface near the bottom of the container, and in which each draft tube draws from near the bottom of its container.

HERMAN E. SCHULSE.